United States Patent
Pelosi et al.

(10) Patent No.: US 7,001,958 B2
(45) Date of Patent: Feb. 21, 2006

(54) ACETOACETYLATED POLYVINYL POLYMERS AND CURABLE COATING COMPOSITIONS MADE THEREFROM

(75) Inventors: Lorenzo Fred Pelosi, Wilmington, DE (US); Patricia Mary Ellen Sormani, Newark, DE (US)

(73) Assignee: E. I. duPont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/079,562

(22) Filed: Mar. 14, 2005

(65) Prior Publication Data

US 2005/0159538 A1 Jul. 21, 2005

Related U.S. Application Data

(62) Division of application No. 10/775,577, filed on Feb. 9, 2004, now Pat. No. 6,894,123.

(60) Provisional application No. 60/456,476, filed on Mar. 21, 2003.

(51) Int. Cl.
*C08C 19/22* (2006.01)

(52) U.S. Cl. ............... 525/379; 525/327.2; 525/328.8; 525/328.9; 525/329.7; 525/329.9; 525/330.3; 525/330.5; 525/374; 525/375; 525/381; 525/383; 525/386; 427/337; 427/385.5; 427/386

(58) Field of Classification Search ............ 525/327.2, 525/328.8, 328.9, 329.7, 329.9, 330.3, 330.5, 525/374, 375, 379, 381, 383, 386; 427/337, 427/385.5, 386

See application file for complete search history.

(56) References Cited

U.S. PATENT DOCUMENTS

| 4,147,702 | A | 4/1979 | Crutchfield et al. |
| 4,296,226 | A | 10/1981 | Braun et al. |
| 4,687,809 | A | 8/1987 | Kamikaseda et al. |
| 5,017,649 | A | 5/1991 | Clemens |
| 5,286,782 | A | 2/1994 | Lamb et al. |
| 5,977,021 | A | 11/1999 | Aoyama et al. |
| 6,221,494 | B1 | 4/2001 | Barsotti et al. |
| 6,815,021 | B1 | 11/2004 | Ishikawa et al. |

FOREIGN PATENT DOCUMENTS

| EP | 0974683 A1 | 1/2000 |
| GB | 1097646 | 1/1968 |
| JP | 2000-000935 | 1/2000 |
| JP | 2003-096382 | 4/2003 |
| WO | WO96/37562 | 11/1996 |
| WO | WO00/31196 | 6/2000 |
| WO | WO2004/0855335 A1 | 10/2004 |

OTHER PUBLICATIONS

Synthesis of Acetoacetylated Resins and Applications for Acetoacetate Chemistry in Thermoset Coatings. F. Del Rector and J. S. Witzeman, Surface Coatings Australia 26 (8) 1989.

*Primary Examiner*—Helen L. Pezzuto
(74) *Attorney, Agent, or Firm*—Sudhir G. Deshmukh

(57) ABSTRACT

The present invention relates to curable coating compositions containing acetoacetylated polyvinyl polymers obtained from polyvinyl polymers, such as polyvinyl butyrals. These coating compositions are especially suitable for use as wash primers in automotive OEM and refinish coating applications.

10 Claims, No Drawings

ACETOACETYLATED POLYVINYL POLYMERS AND CURABLE COATING COMPOSITIONS MADE THEREFROM

CROSS REFERENCE TO RELATED APPLICATION

This application is a divisional of Application Ser. No. 10/775,577, filed Feb. 9, 2004, now U.S. Pat. No. 6,894,123, which claims benefit to 60/456,476 filed Mar. 21, 2003.

FIELD OF INVENTION

The present invention generally relates to coating compositions suitable for use in automotive applications and more particularly relates to wash primers having improved coating adhesion and hardness over conventional wash primers.

BACKGROUND OF THE INVENTION

In coating applications, especially automotive OEM (original equipment manufacturer) or refinish multi-coat systems, multiple layers of coating compositions are applied over metal substrates, such as an automotive body. Typically, the bare metal surface is coated with a wash primer, followed by a coating from a base coating composition, which is further coated with a clear coating composition. If desired, a coating from a primer composition may be applied over the wash primer coating before the application of the base coating composition. The adhesion strength and corrosion resistance of the coating resulting from the wash primer is important for the overall integrity of the multi-coat system. A conventional wash primer is a coating composition that typically includes a polyvinyl butyral dissolved in isopropyl alcohol. It typically also includes a corrosion inhibitor, such as zinc chromate, and an adhesion promoter, such as phosphoric acid that etches the metal surface to improve the adhesion of the primer to the underlying bare metal substrate surface. A layer of the wash primer is typically conventionally applied, such as by using a paint spray gun, to a typical film thickness of about 7.6 micrometers (0.3 mil) to 31 micrometers (1.2 mils), in contrast to a primer, which is typically applied to a film thickness of about 25.4 micrometers (1 mil) to 50.8 micrometers (2 mils) in OEM applications and up to 127 micrometers (5 mils) in refinish applications. Typically, a coating of a conventional primer coating composition is applied over the wash primer coating before additional coatings, such as base and clear coatings are applied.

One of the major problems associated with such conventional wash primers is the presence of the conventional corrosion inhibitor, such as zinc chromate, which is toxic and has an adverse impact on the environment. Thus, attempts have been made to produce chromate free wash primers that equal or improve the corrosion resistance provided by chromate-containing conventional wash primers.

The other problem associated with such conventional wash primers is the tendency of the coatings resulting therefrom to split when exposed to chipping action typically experienced by automotive coating systems.

The chromate free coating compositions of the present invention are not only benign to the environment but they also provide improved chip resistance over conventional wash primers.

STATEMENT OF THE INVENTION

The present invention is directed to a curable composition comprising crosslinkable and crosslinking components wherein said crosslinkable component comprises:

(a) an acetoacetylated polyvinyl polymer having the formula:

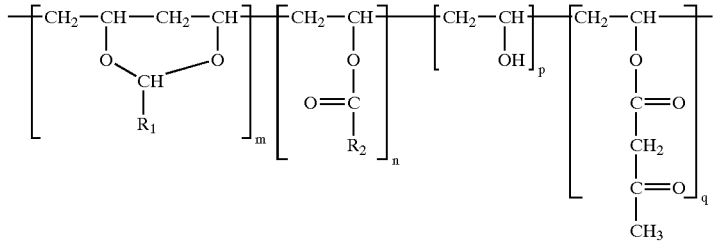

wherein (m) ranges from about 1.5 mole percent to about 85 mole percent, (n) ranges from about 0 mole percent to about 20.5 mole percent, (p) ranges from about 12 mole percent to about 87 mole percent and (q) ranges from about 1 mole percent to about 88 mole percent, sum of (m), (n), (p) and (q) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, said substituents being independently selected from the group consisting of $C_1$ to $C_{12}$ alkoxy, acyl, carboxyl, derivative of carboxyl, sulfonyl, derivative of sulfonyl, cyano, and halo;

(b) an acetoacetylated polyvinyl polymer having the formula:

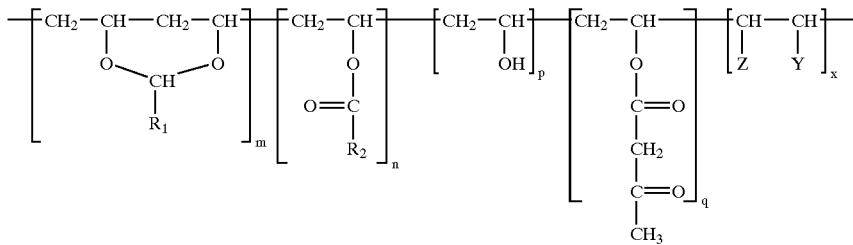

wherein (m) ranges from about 1.5 mole percent to about 85 mole percent, (n) ranges from about 0 mole percent to about 20.5 mole percent, (p) ranges from about 12 mole percent to about 87 mole percent, (q) ranges from about 1 mole percent to about 88 mole percent and (x) ranges from about 0.5 to about 6 mole percent, sum of (m), (n), (p), (q) and (x) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, and wherein Z is H, or —COOH and Y is —COOH, halo, unsubstituted phenyl or a combination thereof; said substituents being independently selected from the group consisting of $C_1$ to $C_{12}$ alkoxy, acyl, carboxyl, derivative of carboxyl, sulfonyl, derivative of sulfonyl, cyano, and halo;

(c) a combination thereof; and wherein said crosslinking component comprises a polyamine, a polyketimine, polyepoxide, polyisocyanate, melamine, $C_1$ to $C_{12}$ alkyl dialdehyde, $C_1$ to $C_{12}$ alkyl poly(meth)acrylate, or a combination thereof.

The present invention is also directed to a method of producing a multi-coat system on a substrate comprising:

(i) mixing a crosslinkable component with a crosslinking component of a curable coating composition to form a pot mix, wherein said crosslinkable component comprises:

(a) an acetoacetylated polyvinyl polymer having the formula:

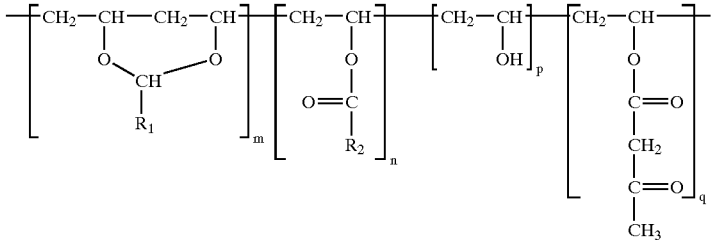

wherein (m) ranges from about 1.5 mole percent to about 85 mole percent, (n) ranges from about 0 mole percent to about 20.5 mole percent, (p) ranges from about 12 mole percent to about 87 mole percent and (q) ranges from about 1 mole percent to about 88 mole percent, sum of (m), (n), (p) and (q) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, said substituents being independently selected from the group consisting of $C_1$ to $C_{12}$ alkoxy, acyl, carboxyl, derivative of carboxyl, sulfonyl, derivative of sulfonyl, cyano, and halo;

(b) an acetoacetylated polyvinyl polymer having the formula:

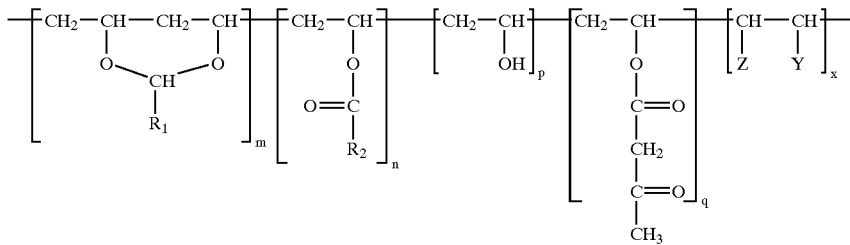

wherein (m) ranges from about 1.5 mole percent to 85 mole percent, (n) ranges from about 0 mole percent to 20.5 mole percent, (p) ranges from about 12 mole percent to about 87 mole percent, (q) ranges from about 1 mole percent to about 88 mole percent and (x) ranges from 0.5 to 6 mole percent, sum of (m), (n), (p), (q) and (x) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, and wherein Z is H, or —COOH and Y is —COOH, halo; unsubstituted phenyl or a combination thereof; said substituents being independently selected from the group consisting of $C_1$ to $C_{12}$ alkoxy, acyl, carboxyl, derivative of carboxyl, sulfonyl, derivative of sulfonyl, cyano, and halo; or (c) a combination thereof; and wherein said crosslinking component comprises a polyamine, a polyketimine, polyepoxide, polyisocyanate, melamine, $C_1$ to $C_{12}$ alkyl dialdehyde, $C_1$ to $C_{12}$ alkyl poly(meth)acrylate, or a combination thereof;

(ii) applying a pot mix layer over said substrate;

(iii) applying a layer of base coating composition on said pot mix layer;

(iv) applying a layer of clear coating composition on said layer of base coating composition to form a multi-layer system on said substrate; and (v) curing said multi-layer system under ambient conditions or at elevated cure temperatures to form said multi-coat system on said substrate.

The present invention is further directed to a method of producing an acetoacetylated polyvinyl polymer by the steps comprising:

(i) dissolving in one or more solvents:

(a) a polyvinyl polymer having the formula:

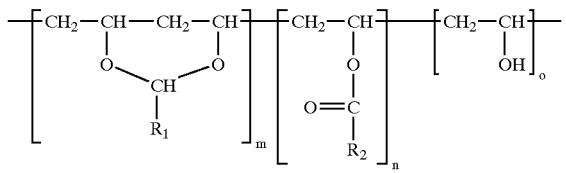

wherein (m) ranges from about 1.5 mole percent to about 85 mole percent, (n) ranges from about 0 mole percent to about 20.5 mole percent and (o) ranges from about 13 mole percent to about 98.5 mole percent, sum of (m), (n) and (o) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, said substituents being independently selected from the group consisting of $C_1$ to $C_{12}$ alkoxy, acyl, carboxyl, derivative of carboxyl, sulfonyl, derivative of sulfonyl, cyano, and halo;

(b) a polyvinyl polymer having the formula:

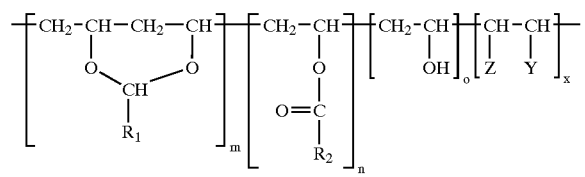

wherein (m) ranges from about 1.5 mole percent to about 85 mole percent, (n) ranges from about 0 mole percent to about 20.5 mole percent and (o) ranges from about 13 mole percent to about 98.5 mole percent and (x) ranges from about 0.5 to about 6 mole percent, sum of (m), (n), (o) and (x) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, and wherein Z is H, or —COOH and Y is —COOH, halo, unsubstituted phenyl or a combination thereof; said substituents being independently selected from the group consisting of $C_1$ to $C_{12}$ alkoxy, acyl, carboxyl, derivative of carboxyl, sulfonyl, derivative of sulfonyl, cyano, and halo; or (c) a combination thereof to form a solution;

(ii) contacting said solution with $C_1$ to $C_{12}$ alkyl acetoacetate to produce said acetoacetylated polyvinyl polymer.

DETAILED DESCRIPTION OF THE PREFERRED EMBODIMENT

As used herein:

"Two-pack coating composition" means a curable coating composition having two components stored in separate containers. The containers containing the two components are typically sealed to increase the shelf life of the components of the coating composition. The components are mixed just prior to use to form a pot mix, which has a limited pot life, typically ranging from a few minutes (15 minutes to 45 minutes) to a few hours (4 hours to 8 hours). The pot mix is applied as a layer of a desired thickness on a substrate surface, such as an auto body. After application, the layer dries and cures at ambient or elevated temperatures to form a coating on the substrate surface having desired coating properties, such as improved adhesion and chip resistance.

"Low VOC coating composition" means a coating composition that includes in the range of from 0.1 kilograms (1.0 pounds per gallon) to 0.72 kilograms (6.0 pounds per gallon), preferably from 0.3 kilograms (2.6 pounds per gallon) to 0.6 kilograms (5.0 pounds per gallon) and more preferably from 0.34 kilograms (2.8 pounds per gallon) to 0.53 kilograms (4.4 pounds per gallon) of the solvent per liter of the coating composition. All VOC's determined under the procedure provided in ASTM D3960.

"High solids composition" means a coating composition having solid component of above 30 percent, preferably in the range of from 35 to 90 percent and more preferably in the range of from 40 to 80 percent, all in weight percentages based on the total weight of the composition.

"GPC weight average molecular weight" means a weight average molecular weight measured by utilizing gel permeation chromatography, such as high performance liquid chromatograph (HPLC) supplied by Hewlett-Packard, Palo Alto, Calif. Unless stated otherwise, tetrahydrofuran was used as the liquid phase and polystyrene standards were used.

"Tg" (glass transition temperature) measured in ° C. determined by DSC (Differential Scanning Calorimetry).

"(Meth)acrylate" means acrylate and methacrylate.

"Polymer solids" or "composition solids" means a polymer or composition in its dry state.

"Crosslinkable component" means a component that includes a compound, polymer or copolymer having functional groups positioned in the backbone of the polymer, pendant from the backbone of the polymer, terminally positioned on the backbone of the polymer, or a combination thereof.

"Crosslinking component" is a component that includes a compound, polymer or copolymer having groups positioned in the backbone of the polymer, pendant from the backbone of the polymer, terminally positioned on the backbone of the polymer, or a combination thereof, wherein these groups are capable of crosslinking with the groups on the crosslinkable component (during the curing step) to produce a coating in the form of crosslinked structures.

"Ambient cure condition" is defined as the temperature range of 12° C. to 45° C. (55° F. to 110° F.) and a humidity range of 15% to 90% that is present in the spraying area.

Acetoacetylated Polyvinyl Polymer

Polyvinyl polymer suitable for producing the acetoacetylated polyvinyl polymers of the present invention is represented by the following formula (I):

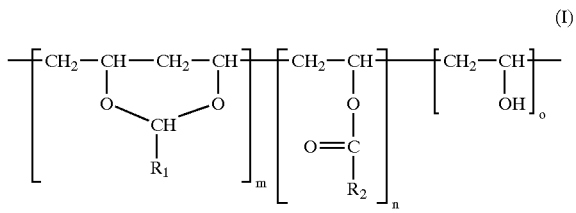

wherein (m) ranges from about 1.5 mole percent to about 85 mole percent, preferably from about 36 mole percent to about 68 mole percent, and more preferably from about 40 mole percent to about 64 mole percent, (n) ranges from about 0 mole percent to about 20.5 mole percent, preferably from about 1 mole percent to about 6 mole percent, and more preferably from about 2 mole percent to about 4 mole percent and (o) ranges from about 13 mole percent to about 98.5 mole percent, preferably from about 32 mole percent to about 63 mole percent, and more preferably from about 34 mole percent to about 55 mole percent. All the foregoing mole percentages are based on the sum of (m), (n) and (o) being 100. It should be noted that the aforementioned groups, (m), (n) and (o) are typically randomly distributed on the polymer backbone. $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, said substituents being independently selected from the group consisting of $C_1$ to $C_{12}$ alkoxy, acyl, carboxyl, derivative of carboxyl, sulfonyl, derivative of sulfonyl, cyano, and halo. Some of the examples of the foregoing for $R_1$ include propyl, phenyl and alkyl-substituted phenyl (preferably tolyl and xylyl). Some of the examples of the foregoing for $R_2$ include methyl, ethyl, propyl, butyl and phenyl. More preferred is polyvinyl butyral having $R_1$ as propyl and $R_2$ as methyl.

More preferred polyvinyl polymers having $R_1$ as propyl and $R_2$ as methyl are typically supplied in the form of fine grained free flowing powder by many suppliers, such as by Clariant Corporation, Charlotte, N.C. under the trademark Mowital®. Some examples of polyvinyl butyrals suitable for use in the present invention include Mowital® B20H [(m) at 49 to 55 mole percent, (n) at 1 to 5 mole percent and (o) at 40 to 46 mole percent], B30T [(m) at 41 to 46 mole percent, (n) at 1 to 5 mole percent and (o) at 49 to 55 mole percent] and B30H [(m) at 50 to 55 mole percent, (n) at 1 to 5 mole percent and (o) at 40 to 46 mole percent].

The polyvinyl polymers suitable for use in the present invention can include copolymers of vinyl acetates with one or more of the following comonomers:

Monocarboxylic acids, such as acrylic, methacrylic, crotonic acids, preferably acrylic, methacrylic acids;

Ethylenically unsaturated dicarboxylic acids, such as maleic, fumaric, itaconic acids, preferably maleic acid;

Anhydride monomers such as, maleic anhydride;

Glycidyl-containing monomers, such as allylglycidyl ether, glycidyl (meth) acrylate, preferably glycidyl. (meth) acrylate;

Halogen-containing monomers, such as vinyl chloride, tetrafluoroethylene, vinyl fluoride and vinyl bromide, preferably vinyl chloride;

$C_2$ to $C_{12}$ alkylenes, preferably ethylene and propylene; and

Phosphate derivatives, preferably vinyl phosphate, and vinyl diphosphate.

The aforedescribed polymers, containing both vinyl acetate and one or more of the aforedescribed comonomers, are conventionally prepared by the hydrolysis of the vinyl acetate groups in the polymer to vinyl alcohol groups followed by reaction, in the presence of acid catalyst, such as phosphoric acid or hydrochloric acid, with one or more aldehydes, such as acetaldehyde, propanaldehyde, butyraldehyde, or a combination thereof to produce the polyvinyl polymer of the following formula (II):

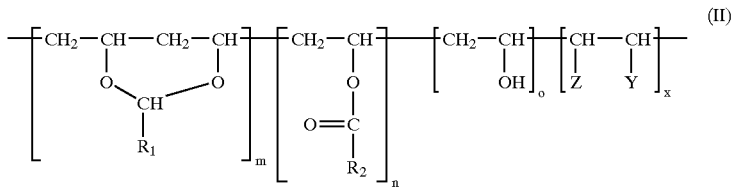

wherein $R_1$, $R_2$ (m), (n) and (o) are the same as those stated in the formula (I) above and wherein Z is H, or —COOH and Y is —COOH, halo, unsubstituted phenyl or a combination thereof and (x) ranges from about 0.5 to about 6 mole percent, preferably from about 1 mole percent to about 5 mole percent, more preferably from about 2 mole percent to about 4 mole percent, sum of (m), (n), (o) and (x) being 100.

By adjusting the proportions of (m) groups, (n) groups and hydroxyl (o) groups on the backbone of polyvinyl polymer of foregoing formulas (I), (II), or a combination thereof, the physical and chemical properties of the resulting polyvinyl polymer can be controlled. The degree of polymerization can also influence on the thermal and mechanical properties of the resulting polyvinyl polymer. Thus, properties of a coating, such as, light-resistance, toughness, elasticity and water resistance from the resulting polyvinyl polymer can be suitably adjusted.

However, polyvinyl polymer coatings when used as wash primer compositions tend to have less than desired adhesion to substrates or chip resistance. Several attempts have been made to reduce the polyvinyl butyral film failure due to splitting and to improve coating adhesion. For example, polyvinyl butyral has been used with conventional crosslinking agents, such as phenolics, epoxies, melamines, isocyanates or dialdehydes to improve the coatings properties, however the curing of such crosslinked systems typically takes place at elevated baking temperatures. A need still exists to utilize a room temperature curable polyvinyl polymer having comparable coating properties.

The applicants of the present invention have unexpectedly discovered that by providing polyvinyl polymer with acetoacetate functionalities, the resulting acetoacetylated polyvinyl polymer not only has desired chip resistance and adhesion, but such a modified polyvinyl polymer can be crosslinked with variety of conventional crosslinking components under ambient conditions or at elevated cure temperatures.

It is believed, without reliance thereon, that the presence of the acetoacetate groups in the acetoacetylated polyvinyl polymer provides coatings resulting therefrom with better intra-coat strength (resistance to splitting), helps maintain adhesion to the metal by making the coating more dimensionally stable and by providing functional groups to chelate with the metal surface, and generally reduces the permeability of the coating. These benefits promise to give chromate-free wash primers with improved properties and corrosion resistance.

The acetoacetylated polyvinyl polymer of the present invention results from the substitution of about 10 mole percent to about 90 mole percent, preferably of about 15 mole percent to about 55 mole percent, more preferably of about 25 mole percent to about 50 mole percent of hydroxy ethylenyl (o) groups on the polyvinyl polymer backbone of the formula (I) with acetoacetate groups. The resulting acetoacetylated polyvinyl polymer of the present invention has the following formula (III):

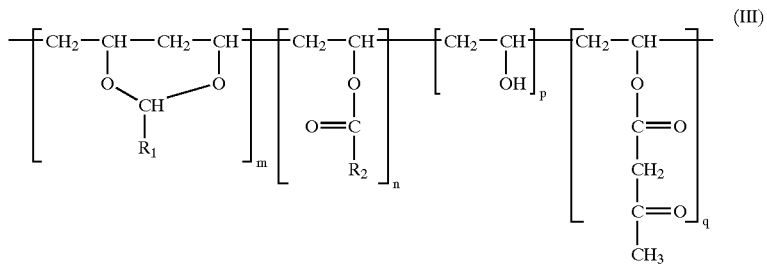

wherein (p) ranges from about 12 mole percent to about 87 mole percent, preferably from about 5 mole percent to about 45 mole percent and more preferably from about 7 mole percent to about 35 mole percent; and (q) ranges from about 1 mole percent to about 88 mole percent, preferably from about 5 mole percent to about 40 mole percent and more preferably from about 10 mole percent to about 30 mole percent. All the foregoing mole percentages are based on the sum of (m), (n), (p) and (q) being 100.

Alternatively, the acetoacetylated polyvinyl polymer of the present invention can also result from the substitution of about 10 mole percent to about 90 mole percent, preferably of about 15 mole percent to about 55 mole percent, more preferably of about 25 mole percent to about 50 mole percent of hydroxy ethylenyl (o) groups on the polyvinyl polymer backbone of the formula (II) with acetoacetate groups. The resulting acetoacetylated polyvinyl polymer of the present invention has the following formula (IV):

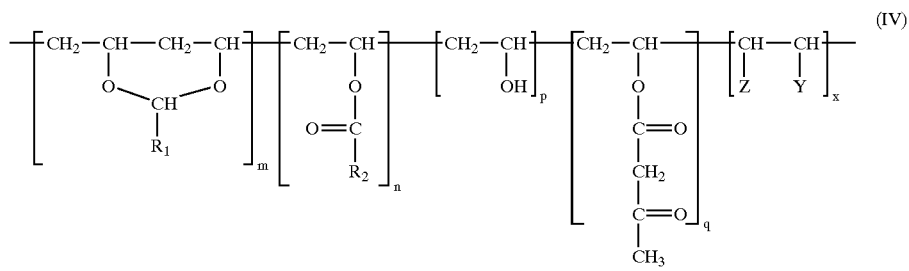

wherein all the functionalities and mole percentages of the acetoacetylated polyvinyl of formula (IV) are those described in formulas, (I), (II), and (III) above. It is understood that a combination of the acetoacetylated polyvinyl polymers of formulas (III) and (IV) can also be utilized.

The GPC weight average molecular weight of the acetoacetylated polyvinyl polymer of formula (III) or (IV) ranges from about 10,000 to about 300,000, preferably from about 20,000 to about 200,000, more preferably from about 30,000 to about 120,000. The Tg of the acetoacetylated polyvinyl polymer ranges from about 0° C. to about 150° C., preferably from about 20° C. to about 90° C., more preferably from about 40° C. to about 60° C. as determined by DSC.

The acetoacetylated polyvinyl polymers of the present invention are produced by contacting the aforedescribed polyvinyl polymer of formulas (I) or (II) with $C_1$ to $C_{12}$ alkyl acetoacetate, preferably t-butyl acetoacetate, to convert about 10 mole percent to about 90 mole percent of hydroxyl on said polyvinyl polymer into acetoacetate groups. The foregoing contacting step preferably takes place at a temperature ranging from about 75° C. to about 135° C., preferably from about 80° C. to about 125° C. and more preferably from about 90° C. to about 120° C. It should be understood that one of ordinary skill in the art could conduct the foregoing reaction at elevated or preferably at atmospheric pressure. Depending upon the reaction temperature, the reaction time can range from 2 minutes to 15 hours. The suitable process is a solution process in which polyvinyl polymer is first dissolved in a solvent, such as butyl acetate, n-methyl pyrolidone, methyl ethyl ketone, methyl propyl ketone, methyl amyl ketone; or a combination thereof, followed by contacting the polyvinyl polymer solution with $C_1$ to $C_{12}$ alkyl acetoacetate. The resulting acetoacetylated polyvinyl polymer can be separated into a free flowing powder or stored as a solution in the solvent described above.

The acetoacetylated polyvinyl polymer of the present invention can be used in making extruded and stamped products, molded floor panels, insulating boards, lacquer primers over metal substrates, in anticorrosive paints, printing inks, temporary binders, and adhesives. A clear extruded film of the acetoacetylated polyvinyl polymer can be laminated to glass panels; such as those used in automotive windshields, to produce shatter-resistant glass.

Curable Coating Composition

The present invention is also directed to a curable coating composition that includes crosslinkable and crosslinking components. These components can be packed in one container (a one-pack composition) wherein the crosslinking groups on the crosslinking agents in the crosslinking component are blocked to prevent premature crosslinking; or the components are packed in two separate containers (a two-pack composition).

Crosslinkable Component

The crosslinkable component includes the acetoacetylated polyvinyl polymer of the present invention solubilized in the solvent described earlier. The acetoacetylated polyvinyl polymer may also be provided in the form of a dried powder. The amount of the acetoacetylated polyvinyl polymer utilized in the present invention typically ranges from about 3 weight percent to about 100 weight percent, preferably from about 35 weight percent to about 70 weight percent, more preferably from about 40 weight percent to about 45 weight percent, all weight percentages based on the total weight of crosslinkable and crosslinking components solids.

The crosslinkable component can further contain from about 0.1% to 50% by weight, based on the total weight crosslinkable and crosslinking components solids, of an acrylic polymer having a GPC weight average molecular weight of about 1,000 to 30,000. The molecular weight is measured by gel permeation chromatography using polymethyl methacrylate as a standard.

Typically the acrylic polymers are prepared from one or more monomers in the following group, such as, for example, acrylic ester monomer including methyl acrylate, ethyl acrylate, butyl acrylate, 2-ethylhexyl acrylate, decyl acrylate, methyl methacrylate, ethyl methacrylate, butyl methacrylate, lauryl (meth)acrylate, isobornyl (meth)acrylate, isodecyl (meth)acrylate, oleyl (meth)acrylate, palmityl (meth)acrylate, stearyl (meth)acrylate, hydroxyethyl (meth) acrylate, acetoacetoxy ethyl (meth)acrylate, and hydroxypropyl (meth)acrylate; acrylamide or substituted acrylamides; styrene or alkyl substituted styrenes; butadiene; ethylene; vinyl acetate; vinyl ester of "Versatic" acid (a tertiary monocarboxylic acid having $C_9$, $C_{10}$ and $C_{11}$ chain length, the vinyl ester is also known as "vinyl versataten), or other vinyl esters; vinyl monomers, such as, for example, vinyl chloride, vinylidene chloride, vinyl pyridine, N-vinyl pyrrolidone; amino monomers, such as, for example, N,N'-dimethylamino (meth)acrylate; chloroprene and acrylonitrile or methacrylonitrile. Acrylic acid, methacrylic acid, crotonic acid, itaconic acid, fumaric acid, maleic acid, monometlyl itaconate, monomethyl fumarate, monobutyl fumarate, maleic anhydride, 2-acrylamido-2-methyl-1-propanesulfonic acid, sodium vinyl sulfonate, and phosphoethyl methacrylate.

Preferably, the acrylic polymer is polymerized from a monomer mixture of about 20 to 30% by weight methyl methacrylate, 20 to 30% by weight isobornyl methacrylate, 5 to 10% by weight hydroxyethyl acrylate, 25–40% by weight acetoacetoxyethyl methacrylate, 10–20% by weight n-butyl acrylate, all weight percentages based on the total weight of monomer solids. The acrylic polymer preferably has a weight average molecular weight of about 3,000 to 35,000. The acrylic polymer can be prepared by solution polymerization in which the monomer mixture, conventional solvents, polymerization initiators, such as 2,2'-azobis (isobutyronitrile) or peroxy acetate, are heated to about 70° to 175° C. for about 1 to 12 hours.

The crosslinkable component of the coating commposition of the present invention can also contain from about 0.01% to 40% by weight, based on the total weight crosslinkable and crosslinking components solids, of a polyester polymer which is the esterification product of an aliphatic or aromatic dicarboxylic acid, a polyol having at least three reactive hydroxyl groups, a diol, an aromatic or aliphatic cyclic anhydride and a cyclic alcohol. One preferred polyester is the esterification product of adipic acid, trimethylol propane, hexanediol, hexahydrophathalic anhydride and cyclohexane dimethylol.

The crosslinkable component can optionally contain, in the range of from 0.1 percent to 50 percent based on the weight of the crosslinkable and crosslinking components, a modifying resin, such as a well-known non-aqueous dispersion (NAD), all percentages being based on the total weight of composition solids.

The non-aqueous dispersion-type polymer is prepared by dispersion polymerizing at least one vinyl monomer in the presence of a polymer dispersion stabilizer and an organic solvent. The polymer dispersion stabilizer may be any of the known stabilizers used commonly in the field of non-aqueous dispersions.

The crosslinkable component of the present invention can be also blended with reactive oligomers covered in U.S. Pat. No. 6,221,494, which is incorporated herein by reference, and non-alicyclic (linear or aromatic) oligomers, if desired. Such non-alicyclic-oligomers can be made by using non-alicyclic anhydrides, such as succinic or phthalic anhydrides, or mixtures thereof. Caprolactone oligomers described in U.S. Pat. No. 5,286,782, incorporated herein by reference, can also be used.

Crosslinking Component

The curable coating composition includes in the range of 10 to 60 percent, preferably in the range of 15 to 55 weight percent and most preferably in the range of 20 to 40 weight percent of the crosslinking component, all weight percentages based on the total weight of the crosslinkable and crosslinking components solids.

The crosslinking component includes a polyamine, a polyketimine, polyepoxide, polyisocyanate, melamine, $C_1$ to $C_{12}$ alkyl dialdehyde, $C_1$ to $C_{12}$ alkyl poly(meth)acrylate, or a combination thereof. Polyamine, a polyketimine, or a combination thereof is preferred and polyketimine is more preferred. When used as a combination of a polyamine and a polyketimine, the ratio thereof by weight parts of polyamine to polyketimine is in the range from 1 to 100 through 100 to 1, preferably in the range of from 1 to 50 through 50 to 1, more preferably in the range of from 1 to 20 through 20 to 1.

The activation ratio ranges from about 0.7 moles to about 4.0 moles, preferably from about 1 mole to about 3 moles of acetoacetoxy groups in the acetoacetylated polyvinyl polymer to 1 mole of crosslinking groups in the crosslinking component.

The polyamine has a weight average molecular weight of at least 100, as determined by gel permeation chromatography using polymethyl methacrylate standards. Typically, the GPC weight average molecular weight ranges from about 100 to about 100,000, preferably from about 200 to about 50,000 and more preferably from about 300 to about 10,000.

The polyamine has an average of at least two primary amine functionalities per molecule. Preferably, the polyamine has an average of from about 2 to about 25 and more preferably, in the range of from about 2 to about 6 primary amine functionalities per polyamine molecule and has 2 to 200, preferably 6 to 100 and more preferably 8 to 50 carbon atoms. These amine functionalities may be present either as pendant functionalities or functionalities positioned in the backbone of the polymer chain. Pendent amine functionalities are preferred.

Examples of representative polyamines suitable for use in the invention include aliphatic or cycloaliphatic amines, or a combination thereof. The aliphatic polyamines are preferred.

Examples of suitable polyamines include ethylenediamine, propylenediamine, butylenediamine, pentamethylenediamine, hexamethylenediamine, decamethylenediamine, 4,7-dioxadecane-1,10-diamine, dodecamethylenediamine, 4,9-dioxadodecane-1,12-diamine, 7-methyl-4,10-dioxatridecane-1,13-diamine, 1,2-diaminocyclohexane, 1,4-diaminocyclohexane, 4,4'-diminodicyclohexyl methane, isophorone diamine, bis(3-methyl-4-aminocyclohexyl)methane, 2,2-bis(4-aminocyclohexyl) propane, nitrile tris(ethane amine), bis(3-aminopropyl) methylamine, 3-amino-1-(methylamino)propane, 3-amino-1-(cyclohexylamino)propane, and N-(2-hydroxyethyl) ethylene diamine. Ethylenediamine, propylenediamine, butylenediamine and 1,2-diaminocyclohexane are preferred.

Other suitable polyamines include those of the formula:

where the $R_1$ and $R_2$ groups can be the same or different and represent an alkylene group containing 2 to 6 and preferably 2 to 4 carbon atoms and n is an independently selected number in the range of from 1 to 6 and preferably in the range of from 1 to 3. The alkylene group is a cycloalkylene group or an alkylene group containing an ether-oxygen atom. Examples of representative polyamines containing polyalkylene groups include diethylene triamine, dipropylene triamine and dibutylene triamine. It is preferred that these polyamines should be of a cycloaliphatic nature and contain 5 to 15 carbon atoms, such as isophoronediamine; more particularly containing an α-alkyl group, such as bis(3-methyl-4-aminocyclohexyl)methane and bis(3-methyl-4-aminocyclohexyl)propane.

Some of the suitable polyepoxides include those containing at least two oxirane groups in the molecule, i.e.,

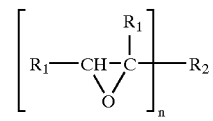

where n is at least 2, $R_1$ is hydrogen or methyl, and $R_2$ broadly represents an organic based molecule or polymer typically composed of carbon, hydrogen, oxygen, and optionally nitrogen, sulfur, or both. Hydroxyl substituent groups may also be present, as well as halogen and ether groups. Generally, the epoxide equivalent weight ranges from about 100 to about 1500, preferably from about 100 to about 1200, and more preferably from about 150 to about 600. These polyepoxides can be broadly categorized as being aliphatic, aromatic, cyclic, acyclic, alicyclic or heterocyclic epoxides.

Another group of useful polyepoxides for use in the present invention includes epoxy novalac resins. These resins are prepared by reacting an epihalohydrin with the condensation product of an aldehyde with a monohydric or polyhydric phenol. One example is the reaction product of epichlorohydrin with a phenolformaldehyde condensate.

Another particularly preferred group of the polyepoxides are the polyglycidyl ethers of polyhydric aromatic hydroxy compounds, such as for example, dihydric phenols. The phenol must be at least dihydric, such as, for example, resorcinol, catechol, hydroquinone, bis(4-hydroxyphenyl)-1,1-isobutane; 4,4-dihydroxybenzophenone; bis(4-hydroxyphenyl)1,1-isobutane; 4,4-dihydroxybenzophenone; bis(4-hydroxyphenyl)-1,1-ethane; bis(2-hydroxynaphenyl) methane; 1,5-hydroxynaphthalene and 4,4'-isopropylidenediphenol, i.e., bisphenol A. Preferably bisphenol A is utilized. Of the many polyepoxides possible, the one principally utilized is epichlorohydrin although epibromohydrin is also quite useful. The polyglycidyl ethers especially useful herein are obtained by reacting epichlorohydrin and bisphenol A in the presence of an alkali, such as sodium or potassium hydroxide. The series of epoxy resins sold by Shell Chemical Company under the trademark EPON are especially useful herein.

Another group of useful polyepoxides are the polyglycidyl ethers derived from reacting epihalohydrin, preferably epichlorohydrin, with polyhydric alcohols, such as ethylene glycol; diethylene glycol; triethylene glycol; 1,2-propylene glycol; 1,4-butylene glycol; 1,5-pentanediol; 1,2,6-hexanetriol; glycerol and trimethylolpropane.

Also useful are the polyepoxides which are polyglycidyl ethers of polycarboxylic acids. These materials are produced by the reaction of an epoxy compound, such as epichlorohydrin with an aliphatic or aromatic polycarboxylic acid such as oxalic acid; succinic acid; glutaric acid; terephthalic acid; 2,6-naphthalene dicarboxylic acid and dimerized linoleic acid.

Still another group of polyepoxides are derived from epoxidation of olefinically unsaturated alicyclic materials. Among these are the epoxy alicyclic ethers and esters, which are well known in the art.

It should be understood that mixtures of the polyepoxides are also useful herein. The preferred epoxy equivalent weight of the polyepoxide(s) is in the range of from 87 to 6000, more particularly the range of from 120 to 1000. Suitable polyepoxides can include those containing oxyalkylene groups, i.e.,

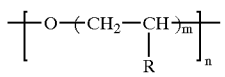

wherein R is hydrogen or $C_1$ to $C_6$ alkyl, m is an integer ranging from 1 to 4 and n is an integer ranging from 2 to 50. The proportion of oxyalkylene groups in the polyepoxide depends upon a number of factors, among them the size of the oxyalkylene group and the nature of the polyepoxide.

Examples of suitable polyisocyanates include aliphatic, cycloaliphatic or aromatic di-, tri- or tetraisocyanates which may or may not be ethylenically unsaturated, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega, omega-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexyl methane-4,4'-d iisocyanate, 3,3'-dimethyl-dicyclohexylmethane-4,4'-diisocyanate, a toluene diisocyanate, 1,3-bis(1-isocyanato 1-methylethyl)benzene, 1,4-bis(1-isocyanato-1-methylethyl)benzene, 1,3-bis(isocyanatomethyl)benzene a xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatod iphenyl methane, a diisocyanatonaphthalene, polyisocyanates having isocyanaurate structural units, the adduct of 2 molecules of a diisocyanate, such as hexamethylene diisocyanate or isophorone diisocyanate, and a diol such as ethylene glycol, the adduct of 3 molecules of hexamethylene diisocyanate and 1 molecule of water (available under the trademark Desmodur®. N from Bayer Corporation of Pittsburgh, Pa.), the adduct of 1 molecule of trimethylol propane and 3 molecules of toluene diisocyanate (available under the trademark Desmodur® L from Bayer Corporation), the adduct of 1 molecule of trimethylol propane and 3 molecules of isophorone diisocyanate, compounds such as 1,3,5-triisocyanato benzene and 2,4,6-triisocyanatotoluene, and the adduct of 1 molecule of pentaerythritol and 4 molecules of toluene diisocyanate.

Suitable melamines for use in the present invention include a monomeric or polymeric melamine-formaldehyde resin (melamine) or a combination thereof. The coating composition can include in the range of from 0.1 percent to 40 percent, preferably in the range of from 15 percent to 35 percent, and most preferably in the range of 20 percent to 30 percent of the melamine, the percentages being in weight percentages based on the total weight of composition solids. The monomeric melamines include low molecular weight melamines which contain, on an average, three or more methylol groups etherized with a $C_1$ to $C_5$ monohydric alcohol such as methanol, n-butanol, or isobutanol per triazine nucleus, and have an average degree of condensation up to about 2 and preferably in the range of about 1.1 to about 1.8, and have a proportion of mononuclear species not less than about 50 percent by weight. By contrast the polymeric melamines have an average degree of condensation of more than 1.9. Some such suitable monomeric melamines include alkylated melamines, such as methylated, butylated, isobutylated melamines and mixtures thereof. Many of these suitable monomeric melamines are supplied commercially. For example, Cytec Industries Inc., West Patterson, N.J. supplies Cymel® 301 (degree of polymerization of 1.5,95% methyl and 5% methylol), Cymel® 350 (degree of polymerization of 1.6,84% methyl and 16% methylol), 303, 325, 327 and 370, which are all monomeric melamines. Suitable polymeric melamines include high amino (partially alkylated, —N, —H) melamine known as Resimene® BMP5503 (molecular weight 690, polydispersity of 1.98, 56% butyl, 44% amino), which is supplied by Solutia Inc., St. Louis, Mo., or Cymel®1158 provided by Cytec Industries Inc., West Patterson, N.J. Cytec Industries Inc. also supplies Cymel® 1130 @ 80 percent solids (degree of polymerization of 2.5), Cymel® 1133 (48% methyl, 4% methylol and 48% butyl), both of which are polymeric melamines.

Some of the suitable crosslinking components include urea formaldehyde polymers, such as methylated urea formaldehyde Resimene® 980 and butylated urea formaldehyde U-6329, which are supplied by Solutia Inc., St. Louis, Mo.

Some of suitable $C_1$ to $C_{12}$ alkyl dialdehyde includes glutaric dialdehyde, glyoxal and 1,3,5-trioxane.

Some of suitable $C_1$ to $C_{12}$ alkyl poly(meth)acrylate includes ethylene di(meth)acrylate, trimethylol propane tri (meth)acrylate.

Metal ion salts can also be employed to crosslink with the acetoacetylated polyvinyl polymer through chelation between the ester carbonyl and the enolic form of the acetoacetate group. This chelation can improve adhesion of the acetoacetylated polyvinyl polymer to metal substrates. Metal ion compounds can be selected from the group consisting of Cu, Co, Fe, Mn, Sn, V, Mg, Ba, Al, Ca, Sr, Nb, Y, Zn, and a combination thereof. Examples include copper acetate, calcium acetate, zinc acetate, or other aliphatic or aromatic organic acid salts.

Other suitable polyamines include reaction products of primary or secondary polyamines, such as ethylene diamine, diethylene triamine and isophorone diamine, with aforedescribed polyfunctional epoxy, polyisocyanate, melamine or a combination thereof.

The polyketimines, which are suitable for use in the present invention, are obtained by blocking the amino groups on the aforedescribed polyamines with a blocking agent, such as a ketone having not more than 18 carbon atoms, preferably 3 to 10 carbon atoms. The polyketimine suitable for use in the coating composition of the present invention has a weight average molecular weight in the range of from 100 to 100,000.

The polyamine is preferably blocked with a ketone represented by the following formula:

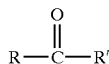

wherein R and R' are independently selected alkyl groups having between 1 and 12, preferably 1 to 8, carbon atoms An aliphatic or cycloaliphatic ketone is preferred and an aliphatic or cycloaliphatic ketone with 3 to 8 carbon atoms is more preferred.

The polyamine suitable for use in the coating composition of the present invention includes:

I. an adduct of an amine of diglycidyl ether based on bis(4-hydroxyphenyl)-2,2-propane;

II. an adduct of an amine and dimethyl maleate;

III. an adduct of an amine prepared from a polyacrylate having at least two acrylate groups per molecular and having a weight molecular weight from about 100 to 50,000;

IV. an adduct of an amine and a polyisocyanate; or

V. a combination thereof.

Examples of suitable blocking agents for the amino groups include acetone, diethyl ketone, methylisobutyl ketone, isobutyraldehyde, hydroxybutyraldehyde, pentanone, cyclohexanone, ethylamyl ketone, hydroxycitronellal, isophorone and decanone.

Depending upon the type of crosslinking component selected, a wide variety of catalysts can be used. For example when polyisocyanate is utilized, tin compounds, including dibutyl tin dilaurate and dibutyl tin diacetate; tertiary amines, such as, triethylenediamine can be used. These catalysts can be used alone or in conjunction with carboxylic acids, such as, acetic acid.

When melamine is utilized in the crosslinking component one or more of the following catalysts can be used to enhance the crosslinking of the components on curing. Generally, the coating composition includes in the range of from 0.1 percent to 5 percent, preferably in the range of from 0.1 to 2 percent, more preferably in the range of from 0.5 percent to 2 percent and most preferably in the range of from 0.5 percent to 1.2 percent of the catalyst, the percentages being in weight percentage based on the total weight of composition solids. Some suitable catalysts include the conventional acid catalysts, such as aromatic sulfonic acids, for example dodecylbenzene sulfonic acid, para-toluenesulfonic acid and dinonylnaphthalene sulfonic acid, all of which are either unblocked or blocked with an amine, such as dimethyl oxazolidine and 2-amino-2-methyl-1-propanol, n,n-dimethylethanolamine or a combination thereof. Other acid catalysts that can be used are strong acids, such as phosphoric acids, more particularly phenyl acid phosphate which may be unblocked or blocked with an amine.

When polyamine or polyketimine is utilized in the crosslinking component one or more of the following catalysts can be used to enhance the crosslinking of the components on curing. Generally, in the range of about 0.001 percent to about 5 percent, preferably in the range of from 0.005 percent to 2 percent, more preferably in the range of from 0.01 percent to 1 percent of the catalyst is utilized, all in weight percent based on the total weight of crosslinkable and crosslinking component solids. Some of the suitable catalysts include water and carboxylic acids, such as acetic, benzoic and salicylic acids.

If desired, the coating composition can include in the range of from 2 weight percent to 10 weight percent, preferably in the range of 3 weight percent to 8 weight percent, more preferably 3.5 weight percent to 6 weight percent of zinc tetraoxychromate, wherein all weight ranges are based on the weight of the coating composition. Zinc tetroxychromate can be included in either the crosslinkable or the crosslinking components of the coating composition; preferably it is included in the crosslinkable component. Zinc tetroxychromate supplied by Rockwood Chemicals, Beltsville, Md., under the trademark J-1345 Basic zinc chromate, can be used in the present invention.

If desired, the coating composition can include in the range of from 0.1% to 6%, preferably in the range of from 0.5% to 4.0% and more preferably 0.8 to 3 wt % of phosphoric acid, all weight percentage are by weight based on the weight of the coating composition. When used in a two-pack coating composition, phosphoric acid is kept separate from the crosslinkable and crosslinking components, and it is mixed with the crosslinkable and crosslinking components just prior to use. Phosphoric acid supplied by Rhodia, Cranbury, N.J., under the name Phosphoric Acid NF 85%, can be used in the present invention.

The coating composition of the present invention can also contain conventional additives, such as pigments, stabilizers, rheology control agents, flow agents, toughening agents and fillers. Selection of such additional additives would, obviously, depend on the intended use of the coating composition. The foregoing additives may be added to either the crosslinkable or crosslinking component, or both, depending upon the intended use of the coating composition.

In use, when the coating composition is packed as a two pack coating composition, the crosslinkable and crosslinking components of the coating composition are mixed just prior to use to form a pot mix, which has limited pot life typically ranging from 10 minutes to 24 hours. A pot mix layer is typically applied to a substrate by conventional techniques, such as spraying, electrostatic spraying, roller coating, dipping or brushing. The pot mix layer then cures under ambient conditions in the range of 10 minutes to 4 hours, preferably in the range of 30 minutes to 60 minutes to form a coating on the substrate having the desired coating properties. It is understood that the actual curing time depends upon the thickness of the applied layer, the type of crosslinking chemistry being used and on the presence or absence of any suitable drying devices, such as fans that assist in continuously flowing air over the coated substrate to accelerate the dry rate. Generally, a wash primer layer having a thickness in the range of from 6 micrometers to 25 micrometers applied over a metal substrate, such as automotive body, cures in 10 to 60 minutes under ambient conditions in the absence of any suitable drying devices, and generally a primer layer having a thickness in the range of from 25 micrometers to 300 micrometers applied over a metal substrate, such as automotive body, cures in 2 hours to 4 hours under ambient conditions in the absence of any suitable drying devices. If desired, baking the coated substrate at a temperature of about 60° C. for about 30 minutes may further accelerate the cure rate. The foregoing baking step is particularly useful under OEM (Original Equipment Manufacture) conditions.

When the coating composition is packaged as a one-pack composition, a layer of the coating composition is applied in a manner similar to that described earlier. However, since the crosslinking groups in the crosslinking components are blocked, the layer is typically subjected to bake cure temperatures to unblock the crosslinking groups so that they can crosslink with the crosslinkable groups presented in the crosslinkable component. Typically baking step takes place at baking temperatures ranging from 60° C. to 200° C., preferably ranging from 80° C. to 160° C., for about 10 to 60 minutes.

It is also contemplated that the crosslinkable and crosslinkable components can be mixed together and conventionally produced in the form of a free flowing powder. The crosslinking groups in the crosslinking components would preferably be blocked to prevent premature crosslinking with crosslinkable groups in the crosslinkable components. The aforedescribed coating composition in the form of a powder can be conventionally applied over a substrate through a fluidized bed. Alternatively, aqueous slurry of the powder can be utilized, which can then be conventionally applied over a substrate. An applied layer of the powder can then be typically subjected to bake cure temperatures to unblock the crosslinking groups so that they can crosslink with the crosslinkable groups presented in the crosslinkable component and form a coating on the substrate.

The present invention is also directed to a method of producing a multi-coat system, preferably multi-coat automotive OEM or refinishes, that includes the coating composition of the present invention as a wash primer. In such a method, a layer of the composition of the present invention is applied over a bare metal substrate to produce a wash primer coating by using the steps described earlier The wash primer coating is then followed by the conventional application of a coating of a conventional base coating composition, which can be pigmented, followed by the conventional application of a coating of a conventional clear coating composition. If desired, an additional coating from a conventional primer coatirig composition can be applied over the wash primer coating before the application of the layer of the base coat composition.

It should be noted that the applicants have unexpectedly discovered that a lower molecular weight, typically ranging from 10,000 to 50,000 acetoacetylated polyvinyl polymer can be used, since the properties are improved by incorporation of the acetoacetate functionality and crosslinking of the polymer. As a result, the solubility of the acetoacetylated polyvinyl polymer is improved, and the viscosity decreased, and therefore the VOC (volatile organic content) of the coating composition can be reduced to produce low VOC coating compositions without adversely affecting the ease of application, such as conventional spray application.

The coating composition of the present invention is also suitable for use in industrial coatings, such as coil coatings, adhesives and sealants. The coating composition of the present invention can be suitably applied over:

Woven or non-woven cellulosic or non-cellulosic fabrics; leather or non-leather goods, such as shoes, boots, sandals, sneakers, gloves, hats and upholstery; various sports and athletics related footwear, such as sneakers, running shoes, roller blade shoes; foot ball shoes; sports and recreation equipments such as golf clubs, balls, tees, skis, jet skis, wet bikes, snowmobiles, skates, hockey rink surfaces, hockey pucks and hockey sticks, bowling alley lanes, bowling pins and balls; fake fruits and dry flowers; fiber optics; packaging materials, such as bottles, beverage cases, food bags and boxes; finger nails and fake finger nails; safety glass, shatterproof glass and eye Wear glasses; plasticizer migration resistant coating over vinyl surfaces; furniture, including lawn furniture; roof and roof tiles; textured and soft-feel wall coverings; toys, such as Nerf®balls; light fixtures and bulbs; communications equipment, such as phones, pagers and fax machines; credit cards; luggage and attaches; touch screen television tubes, cathode ray tubes and radar screens, liquid crystal and flat panel displays; mirrors; non-skid floorings; sound absorbent acoustical walls, ceilings and seats, acoustical equipment; marine surfaces, such as boat hulls, buoys, jetties, ship decks, sail canvas; office equipment, such as computers, photocopying machines, computer printers; musical instruments, such as piano, guitars, organs; costume jewelry; and bright metallic surfaces.

Due to their durable nature, the coating from the composition of the present invention may be used as durable long life traffic markings on road surfaces, including reflective road markings.

EXAMPLES

The following test procedures were used for generating data reported in the examples below.

Persoz Hardness

The film hardness was measured using a Persoz hardness tester Model No. 5854 (ASTM D4366), supplied by Byk-Mallinckrodt, Wallingford, Conn. The number of oscillations, referred to as Persoz number or Persoz hardness, were recorded over time.

Fischer Hardness

Hardness was measured using a Fischerscope® hardness tester (the measurement was in Newtons per square millimeter).

Molecular Weight

The molecular weights of the acrylic polymers were measured by size exclusion chromatography on Hewlett Packard 1090 High Performance Liquid Chromatography with 1047A RI detector. Microstyragel columns from Waters Inc. with tetrahydrofuran as the mobile phase and polystyrene standards of known mblecular weight was used for molecular weight determination.

Solids Measurement

The non-volatile content of polymer solutions was measured by removing the solvent of a polymer sample in down draft oven at 110° C. A known quantity of the polymer solution was mixed with tricresyl phosphate and acetone, and placed in a down draft oven maintained at 110±10° C. for one hour. The weight of the residue was used to calculate the wt % solids.

$^{13}$C NMR (Mole Percentage Determination)

The mole percentages of acetoacetate groups on the acetoacetylated polyvinyl polymer samples were determined through a Bruker DRX-400 NMR spectrometer equipped with a 10 mm broad banded probe. The polymer samples were vacuum dried at 50° C., dissolved in deuterated methanol at approximately 5 to 10 weight percent and run through the spectrometer at about 34° C. using a 30 second relaxation delay and a 90° flip pulse to insure quantitation.

From the ratio of the acetoacetate carbonyl to the carbon in the butyral ring between the oxygen atoms, and knowing the molar ratio of vinyl alcohol to butyral in the polymer backbone from the literature, the mole percentages of vinyl alcohol that was substituted by acetoacetate group was calculated.

Adhesion Test

The coated panels were tested for dry, wet and recovered adhesions. For dry adhesion a cross cut and a grid hatch were made on the panel, tape was applied and removed. The panel was then given two ratings. The first rating was from a visual scale of 0 to 10 based on the amount of coating removed, 0 being total failure and 10 being no coating removed. The second rating was the point-of-failure that occurred as described above. The panels were then placed in a humidity cabinet maintained in compliance with ASTM D-1735-02 for 4 days. The panels were removed from the humidity cabinet and the wet adhesion was measured within one hour. The panels were then stored at 25° C. and 50% relative humidity for 24 hours and then retested to measure the recovered adhesion.

Example 1

To a glass reactor equipped with an agitator, condenser, distillation head, and under nitrogen atmosphere, 200 parts of Mowital® B20H (GPC weight average molecular weight of about 35,000 to 45,000) polyvinyl butyral supplied by Clariant Corporation were added to 606 parts of n-methyl pyrolidone. The solution was heated to 190° C. to remove any low boiling solvent. The solution was then cooled to between 140° C. and 145° C. and 68.2 parts of t-butyl acetoacetate were added over a period of several minutes. The batch was held 30 minutes at temperature and then was heated to about 195° C. to remove t-butanol by-product to produce acetoacetylated polyvinyl butyral of formula (III) above wherein (p) is 32 and (q) is 11. The polymer was isolated by precipitation into cold water, (0.473 liter (1 pint) of water to 150 g of polymer solution), filtered, and dried under vacuum at 45° C.

Example 2

To a glass reactor equipped with an agitator, condenser, distillation head, and under nitrogen atmosphere, 300 parts of Butvar® B90 (GPC weight average molecular weight about 90,000) polyvinyl butyral supplied by Solutia Inc., Springfield, Mass. were added to 2000 parts of n-methyl pyrolidone. The solution was heated to 190° C. to remove any low boiling solvent. The solution was then cooled to between 140° C. and 145° C. and 102.3 parts of t-butyl acetoacetate were added over a period of several minutes. The batch was held 30 minutes at temperature and then was heated to about 195° C. to remove t-butanol by-product and to produce acetoacetylated polyvinyl butyral of formula (III) above wherein (p) is 35 and (q) is 8. The polymer was isolated by precipitation into cold water, (0.473 liter (1 pint) of water to 150 g of polymer solution), filtered, and dried under vacuum at 45° C.

Example 3

To a glass reactor equipped with an agitator, condenser, distillation head, and under nitrogen atmosphere, 300 parts of Mowital® B30T (GPC weight average molecular weight about 55,000) polyvinyl butyral supplied by Clariant Corporation were added to 909 parts of n-methyl pyrolidone. The solution was heated to between 130° C. to 135° C. and 137.3 parts of t-butyl acetoacetate were added over a period of several minutes. The batch was held at temperature for 3 hours, and then cooled to produce acetoacetylated polyvinyl butyral of formula (III) above wherein (p) is 39 and (q) is 12. The polymer was isolated by precipitation into cold water, (0.473 liter (1 pint) of water to 150 g of polymer solution), filtered, washed with cold water, filtered, and dried under vacuum first at room temperature for a day, then at 45° C. for a second day, and at 80° C. for a third day.

Example 4

To a glass reactor equipped with an agitator, condenser, distillation head, and under nitrogen atmosphere, 250 parts of Mowital® B30H (GPC weight average molecular weight about 60,000) polyvinyl butyral supplied by Clariant Corporation were added to 1667 parts of n-methyl-pyrolidone. The solution was heated to 190° C. to remove any low boiling solvent. The solution was then cooled to between 140° C. to 145° C. and 85.3 parts of t-butyl acetoacetate were added over a period of several minutes. The batch was held 30 minutes at temperature and then heated to about 195° C. to remove t-butanol by-product and then cooled to produce acetoacetylated polyvinyl butyral of formula (III) above wherein (p) is 37 and (q) is 6. The polymer was isolated by precipitation into cold water, (0.473 liter (1 pint) of water to 150 g of polymer solution), filtered, washed with cold water, filtered, and dried at room temperature overnight, then at 60° C. under vacuum for about 7 hours.

Example 5

To a glass reactor equipped with an agitator, condenser, distillation head, and under nitrogen atmosphere, 50 parts of Pioloform® LL145 (GPC weight average molecular weight about 95,000 to 100,000) polyvinyl butyral supplied by Wacker Polymer System, Adrian, Mich. were added to 333 parts of n-methyl pyrolidone. The solution was heated to 190° C. to remove any low boiling solvent. The solution was then cooled to between 140° C. to 145° C. and 17.1 parts of t-butyl acetoacetate were added over a period of several minutes. The batch was held 30 minutes at temperature and then heated to about 195° C. to remove t-butanol by product and then cooled to produce acetoacetylated polyvinyl butyral of formula (III) above wherein (p) is 33 and (q) is 10. The polymer was isolated by precipitation into cold water, (0.473 liter (1 pint) of water to 150 g of polymer solution), filtered, washed with cold water, filtered, and dried at room temperature overnight, then at 60° C. under vacuum for about 7 hours.

Example 6

To a glass reactor equipped with an agitator, condenser, distillation head, and under nitrogen atmosphere, 50 parts of Mowital® B60H (GPC weight average molecular weight about 95,000) polyvinyl butyral supplied by Clariant Corporation were added to 300 parts of n-methyl pyrolidone. The solution was heated to 190° C. to remove any low boiling solvent. The solution was then cooled to between 140° C. to 145° C. and 17.1 parts of t-butyl acetoacetate were added over a period of several minutes. The batch was held 30 minutes at temperature and then heated to about 195° C. to remove t-butanol by-product and then cooled to produce acetoacetylated polyvinyl butyral of formula (III) above wherein (p) is 35; and (q) is 7. The polymer was isolated by precipitation into cold water, (0.473 liter (1 pint) of water to 150 g of polymer solution), filtered, washed with cold water, filtered, and dried at room temperature overnight, then at 60° C. under vacuum for about 7 hours.

Example 7

To a glass reactor equipped with an agitator, condenser, distillation head, and under nitrogen atmosphere, 1500 parts of Pioloform® LL4150 (GPC weight average molecular weight about 35,000) polyvinyl butyral supplied by Wacker Polymer System were added to 1500 parts of methyl propyl ketone. The solution was heated to 75° C. and 202 parts of t-butyl acetoacetate were added over a period of several minutes. The batch was held 3 hours at 75° C. and then heated over a period of about 2.5 hours to about 100° C. to remove t-butanol by-product. The batch was then cooled to produce acetoacetylated polyvinyl butyral of formula (III) above wherein (p) was 26 and (q) was 10.

Example 8

To a glass reactor equipped with an agitator, condenser, distillation head, and under nitrogen atmosphere, 1000 parts of Pioloform® LL4150 (GPC weight average molecular weight about 35,000) polyvinyl butyral supplied by Wacker Polymer System were added to 1000 parts of methyl propyl ketone. The solution was heated to 75° C. and 377 parts of t-butyl acetoacetate were added over a period of several minutes. The batch was held 3 hours at 75° C. and then heated over a period of about 2.5 hours to about 100° C. to remove t-butanol by-product. The batch was then cooled to produce acetoacetylated polyvinyl butyral of formula (III) above wherein (p) was 8 and (q) was 28.

Example 9

To a glass reactor equipped with an agitator, condenser, and under nitrogen atmosphere, 500 parts of Pioloform® LL4150 (GPC weight average molecular weight about 35,000) polyvinyl butyral supplied by Wacker Polymer System were added to 611 parts of methyl ethyl ketone. The solution was heated to 75° C. and 80.8 parts of t-butyl acetoacetate were added over a period of several minutes. The batch was held 3 hours at 75° C. and then cooled to produce acetoacetylated polyvinyl butyral of formula (III) above wherein (p) was 28 and (q) was 8. The polymer was isolated by precipitation into cold water, (0.473 liter (1 pint) of water to 150 g of polymer solution), filtered, washed with cold water, filtered, and dried at room temperature under vacuum at room temperature for about 7 hours, and then under vacuum at about 55° C. for about 7 hours.

Example 10

To a glass reactor equipped with an agitator, condenser, distillation head, and under nitrogen atmosphere, 500 parts of Pioloform® LL4150 (GPC weight average molecular weight about 35,000) polyvinyl butyral supplied by Wacker Polymer System were added to 611 parts of n-methyl pyrrolidone. The solution was heated to 130° C. and 255.9 parts of t-butyl acetoacetate were added over a period of several minutes. The batch was held 3 hours at 130° C. and then cooled to produce acetoacetylated polyvinyl butyral of formula (III) above wherein (p) was 9 and (q) was 27. The polymer was isolated by precipitation in cold water, (0.473 liter (1 pint) of water to 150 g of polymer solution), filtered, washed with cold water, filtered, and dried at room temperature under vacuum at room temperature for about 7 hours, and then under vacuum at about 55° C. for about 7 hours.

Example 11

To a glass reactor equipped with an agitator, condenser, distillation head, and under nitrogen atmosphere, 1000 parts of Pioloform® LL4150 (GPC weight average molecular weight about 35,000) polyvinyl butyral supplied by Wacker Polymer System were added to 1000 parts of n-butyl acetate. The solution was heated to 75° C. and 161.6 parts of t-butyl acetoacetate were added over a period of several minutes. The batch was held 3 hours at 75° C. and then heated over a period of about 2.5 hours to about 115° C. to remove t-butanol by-product. The batch was then cooled to produce acetoacetylated polyvinyl butyral of formula (III) above wherein (p) was 23 and (q) was 13.

Example 12

To a glass reactor equipped with an agitator, condenser, distillation head, and under nitrogen atmosphere, 1000 parts of Pioloform® LL4150 (GPC weight average molecular weight about 35,000) polyvinyl butyral supplied by Wacker Polymer System were added to 1000 parts of n-butyl acetate. The solution was heated to 75° C. and 377 parts of t-butyl acetoacetate were added over a period of several minutes. The batch was held 3 hours at 75° C. and then heated over a period of about 2.5 hours to about 115° C. to remove t-butanol by-product. The batch was then cooled to produce acetoacetylated polyvinyl butyral of formula (III) above wherein (p) was 7 and (q) was 29.

Coating Compositions

Three primer compositions (Ctng Ex.) and one comparative primer composition (Comp. Ctng Ex. 1) were produced by sequentially adding components listed in Table 1 below:

TABLE 1

|  | Ctng Ex. 1 | Ctng Ex. 2 | Ctng Ex. 3 | Comp. Ctng Ex.1 |
|---|---|---|---|---|
| Crosslinkable Component | | | | |
| Example 9 | 6.2 | | | |
| Example 10 | | 6.2 | 12.2 | |
| Acrylic polymer[1] | 100.4 | 98.7 | 92 | 105.7 |
| Acac oligomer[2] | 66.9 | 65.8 | 61.4 | 70.4 |
| Ethanol | 6.5 | 6.2 | 12 | 0 |
| Catalyst[3] | 4.2 | 4.2 | 4.1 | 4.2 |

TABLE 1-continued

|  | Ctng Ex. 1 | Ctng Ex. 2 | Ctng Ex. 3 | Comp. Ctng Ex.1 |
|---|---|---|---|---|
| Crosslinking Component | | | | |
| Ketimine[4] | 115.8 | 118.9 | 118.4 | 119.6 |
| Total | 300 | 300 | 300 | 300 |

[1]Acrylic polymer resulted from polymerization of a monomer mixture of 25% methyl methacrylate, 25% isobornyl methacrylate, 6% hydroxyethyl acrylate, 31% acetoacetoxyethyl methacrylate, and 13% n-butyl acrylate initiated with t-butylperoxyacetate at 60 wt% solids in butyl acetate, all percentages being in weight percent based on the total weight of the monomer mixture. The polymer had a GPC weight average molecular weight ~23,000 and calculated Tg of 17° C.

[2]Acetoacetoxy oligomer was the reaction product of 1 mole of pentaerythritol, 4 moles of methylhexahydrophthalic anhydride, 4.2 moles of butylene oxide and 3.6 moles of t-butylacetoacetate, using tetraethyl ammonium bromide as catalyst. The t-butanol byproduct is removed by distillation. The oligomer had GPC weight average Mw ~1475 and measured Tg of 10° C. (GPC was run using polymethyl methacrylate standards.).

[3]Catalyst solution of 10% benzoic acid and 13.6% triethyl amine by weight in a mixture of primary amyl acetate, xylene and isobutyl alcohol.

[4]4975S Mid-temperature Ketimine Activator supplied by DuPont Company, Wilmington, Delaware.

The crosslinkable and crosslinking components of the primers of coating compositions described in Table 1 above were mixed to form pot mixes, layers of which were applied with a draw-down bar over electro-coated steel test panels to a dry film thickness of 1.5 to 2 mils (38 to 59 micrometers). The layers were dried until the times specified in Table 2 below at 25° C. and 50% relative humidity. The cured coatings were then tested at the indicated times for hardness, the results of which are shown in Table 2 below. The Tg was also measured on films allowed to cure for 30 days under the conditions described above.

TABLE 2

|  | Persoz Hardness | | Fischer Hardness | | | Tg in ° C. |
|---|---|---|---|---|---|---|
|  | 3 hrs | 24 hrs | 1 Day | 7 Days | 30 Days |  |
| Ctng Ex. 1 | 22 | 61 | 9.9 | 21 | 63 | 33.3 |
| Ctng Ex. 2 | 23 | 65 | 9.3 | 21.1 | 62 | 38.7 |
| Ctng Ex. 3 | 25 | 75 | 12.5 | 32.1 | 77 | 42.2 |
| Comp. Ctng Ex. 1 | 19 | 49 | 7.1 | 13.3 | 46 | 36.7 |

From Table 2 it can be readily seen that primer compositions of the present invention provide increased coating hardness without substantial increase in the Tg of the cured film.

The examples shown in Table 3 below, were prepared by sequentially adding the components in Table 3, to compare the coating properties of unmodified polyvinyl polymer against the acetoacetylated polyvinyl polymer of the present invention. All the compositions below were adjusted to provide 30 percent solids.

TABLE 3

|  | Comp. Ctng Ex. 2 | Ctng Ex. 4 | Ctng Ex. 5 | Ctng Ex. 6 | Ctng Ex. 7 | Ctng Ex. 8 |
|---|---|---|---|---|---|---|
| Crosslinkable Component | | | | | | |
| Poly Vinyl Butyral[1] | 20 | | | | | |
| Example 9 | | 55 | 50 | | | |
| Example 10 | | | | 56.02 | 30.6 | 44.8 |
| Crosslinking Component | | | | | | |
| Ketimine[2] | | | 8.87 | | 36.8 | 18 |
| Ethanol | 26.6 | 73.2 | 72.6 | 72.6 | 64.7 | 70.3 |
| Tolune | 20.1 | 55.2 | 55.7 | 54.7 | 48.8 | 53.1 |
| Total | 66.7 | 183.4 | 187.17 | 183.32 | 180.9 | 186.2 |

[1]Pioloform ® LL4150 polyvinyl butyral supplied by Wacker Polymer System.
[2]Setalux ® 10-1440 Ketimine supplied by AKZO Nobel Chemicals, Inc.

The crosslinkable and crosslinking components of the wash primers of coating compositions described in Table 3 above were mixed to form pot mixes, layers of which were applied with a draw-down bar over electro-coated steel test panels to a dry film thickness of 1.5 to 2 mils (38 to 50 micrometers). The layers were then dried for the times specified in Table 4 at 25° C. and 50% relative humidity. The cured coatings were then tested for hardness, the results of which are shown in Table 4 below. The Tg was also measured on films allowed to cure for 30 days under the conditions described above.

TABLE 4

|  | Persoz Hardness | | Fischer Hardness | | | | Tg in ° C. |
|---|---|---|---|---|---|---|---|
|  | 3 hrs | 24 hrs | 1 Day | 7 Days | 14 Days | 21 Days |  |
| Comp. Ctng Ex.2 | 97 | 213 | 51 | 107 | 127 | 136 | 64.7 |
| Ctng Ex. 6 | 36 | 108 | 10.4 | 28 | 53 | 111 | 27.7 |
| Ctng Ex. 7 | 94 | 243 | 68 | 107 | 120 | 135 | 63.6 |
| Ctng Ex. 8 | 89 | 227 | 60 | 110 | 119 | 130 | 61.2 |
| Ctng Ex. 4 | 65 | 157 | 19.5 | 49 | 74 | 107.8 | 43.4 |
| Ctng Ex. 5 | 85 | 177 | 27 | 67 | 95 | 129 | 48.5 |

From Table 4 above, it can be seen that:

1. The coatings resulting from coating composition containing crosslinkable and crosslinking components exhibited increased coating Tg and hardness (Ctngs. Ex. 7, 8 compared to Ctng. Ex 6 and Ctng. Ex. 5 compared to Ctng Ex. 4); and 2. Over time the coating hardness also increased, which is desired.

Some of the coatings from compositions shown in Table 3 were tested for their adhesion to various test panels. Comparative Composition Example 3 (Comp. Ex. 3) was Butvar® B90 polyvinyl butyral. The results are shown in Table 5 below:

TABLE 5

| | Under Dry Conditions | | Under Wet Conditions | | After Recovery | |
|---|---|---|---|---|---|---|
| | # Hatch | X hatch | # Hatch | X hatch | # Hatch | X hatch |
| Adhesion over cold rolled steel panels | | | | | | |
| Comp. Ctng Ex. 2 | 9 | 10 | 8 | 9 | 10 | 10 |
| Comp. Ctng Ex. 3 | 0 | 2 | 0 | 0 | 0 | 0 |
| Ctng Ex. 4 | 9 | 10 | 8 | 9 | 10 | 10 |
| Ctng Ex. 5 | 10 | 10 | 9 | 10 | 10 | 10 |
| Adhesion over aluminum panels | | | | | | |
| Comp. Ctng Ex. 2 | 10 | 10 | 10 | 10 | 10 | 10 |
| Comp. Ctng Ex. 3 | 10 | 10 | 10 | 10 | 10 | 10 |
| Ctng Ex. 4 | 10 | 10 | 1 | 1 | 1 | 1 |
| Ctng Ex. 5 | 10 | 10 | 10 | 10 | 10 | 10 |
| Adhesion over galvanized steel panels | | | | | | |
| Comp. Ctng Ex. 2 | 10 | 10 | 8 | 8 | 10 | 10 |
| Comp. Ctng Ex. 3 | 0 | 2 | 0 | 0 | 5 | 2 |
| Ctng Ex. 4 | 10 | 10 | 8 | 10 | 10 | 10 |
| Ctng Ex. 5 | 10 | 10 | 0 | 0 | 9 | 10 |

From Table 5, it can be seen that the coating compositions of the present invention can be suitably used over various types of substrates. Even though the coating composition of the present invention containing only the acetoacetylated polyvinyl butyral (Ctng Ex. 4) had less than optimum adhesion over aluminum substrate, the same acetoacetylated polyvinyl butyral when crosslinked (Ctng Ex. 5) had dramatically improved adhesion to aluminum substrates. Although the acetoacetylated polyvinyl butyral resin had less than optimum wet adhesion to galvanized steel (Ctng. Ex. 5), the recovered adhesion was very good. Comparative Coating 3, which is commonly employed in commercial wash primers, had inferior coating properties when compared to the polymers of the present invention, as evidenced by its poor adhesion to galvanized steel, and cold rolled steel.

What is claimed is:

1. A curable coating composition comprising crosslinkable and crosslinking components wherein said crosslinkable component comprises:

(a) an acetoacetylated polyvinyl polymer having the formula:

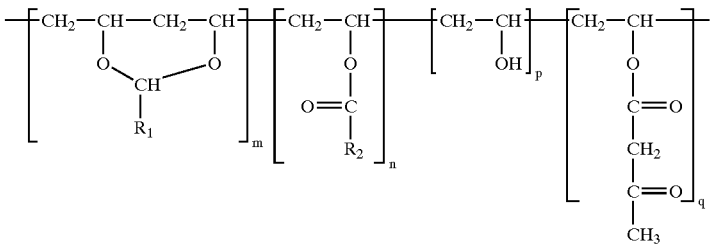

wherein (m) ranges from about 1.5 mole percent to about 85 mole percent, (n) ranges from about 0 mole percent to about 20.5 mole percent, (p) ranges from about 12 mole percent to about 87 mole percent and (q) ranges from about 1 mole percent to about 88 mole percent, sum of (m), (n), (p) and (q) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, said substituents being independently selected from the group consisting of $C_1$ to $C_{12}$ alkoxy, acyl, carboxyl, derivative of carboxyl, sulfonyl, derivative of sulfonyl, cyano, and halo;

(b) an acetoacetylated polyvinyl polymer having the formula:

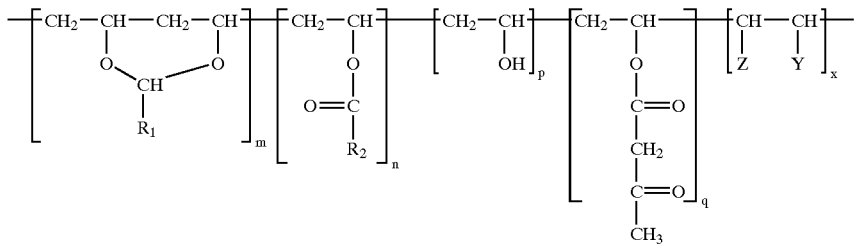

wherein (m) ranges from about 1.5 mole percent to about 85 mole percent, (n) ranges from about 0 mole percent to about 20.5 mole percent, (p) ranges from about 12 mole percent to about 87 mole percent, (q) ranges from about 1 mole percent to about 88 mole percent and (x) ranges from about 0.5 to about 6 mole percent, sum of (m), (n), (p), (q) and (x) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, and wherein Z is H, or —COOH and Y is —COOH, halo, unsubstituted phenyl or a combination thereof; said substituents being independently selected from the group consisting of $C_1$ to $C_{12}$ alkoxy, acyl, carboxyl, derivative of carboxyl, sulfonyl, derivative of sulfonyl, cyano, and halo; or (c) a combination thereof; and wherein said crosslinking component comprises a polyamine, a polyketimine, polyepoxide, polyisocyanate, melamine, $C_1$ to $C_{12}$ alkyl dialdehyde, $C_1$ to $C_{12}$ alkyl poly(meth)acrylate, or a combination thereof.

2. The coating composition of claim 1 wherein in said acetoacetylated polyvinyl polymer $R_1$ is propyl and $R_2$ is methyl.

3. The coating composition of claim 1 wherein GPC weight average molecular weight of said acetoacetylated polyvinyl polymer ranges from about 20,000 to about 300,000.

4. The coating composition of claim 1 wherein Tg of the acetoacetylated polyvinyl polymer ranges from about 40° C. to about 60° C.

5. The coating composition of claim 1 wherein said acetoacetylated polyvinyl polymer is solubilized in one or more solvents.

6. The coating composition of claim 1 wherein said crosslinking component comprises a polyamine, a polyketimine, or a combination thereof.

7. The coating composition of claim 1 wherein VOC of said composition ranges from 0.1 to 0.72 kilograms per liter of said composition.

8. The curable coating composition of claim 1 wherein said acetoacetylated polyvinyl polymer is produced by the steps comprising:

(i) dissolving in one or more solvents:

(a) a polyvinyl polymer having the formula:

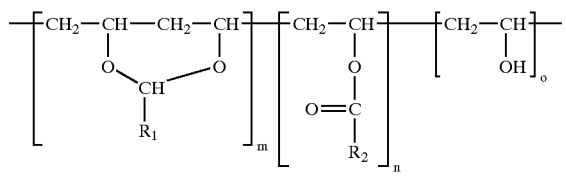

wherein (m) ranges from about 1.5 mole percent to about 85 mole percent, (n) ranges from about 0 mole percent to about 20.5 mole percent and (o) ranges from about 13 mole percent to about 98.5 mole percent, sum of (m), (n) and (o) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, said substituents being independently selected from the group consisting of $C_1$ to $C_{12}$ alkoxy, acyl, carboxyl, derivative of carboxyl, sulfonyl, derivative of sulfonyl, cyano, and halo;

(b) a polyvinyl polymer having the formula:

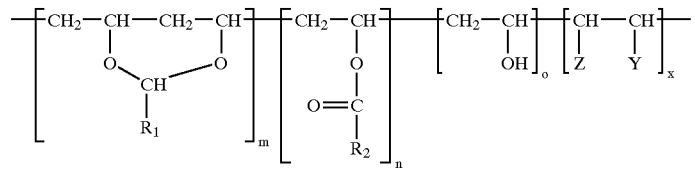

wherein (m) ranges from about 1.5 mole percent to about 85 mole percent, (n) ranges from about 0 mole percent to about 20.5 mole percent and (o) ranges from about 13 mole percent to about 98.5 mole percent and (x) ranges from about 0.5 to about 6 mole percent, sum of (m), (n), (o) and (x) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, and wherein Z is H, or —COOH and Y is —COOH, halo, unsubstituted phenyl or a combination thereof; said substituents being independently selected from the group consisting of $C_1$ to $C_{12}$ alkoxy, acyl, carboxyl, derivative of carboxyl, sulfonyl, derivative of sulfonyl, cyano, and halo; or (c) a combination of thereof to form a solution;

(ii) contacting said solution with $C_1$ to $C_{12}$ alkyl acetoacetate to produce said acetoacetylated polyvinyl polymer.

9. The composition of claim 8 wherein said $R_1$ is propyl and said $R_2$ is methyl.

10. The coating composition of claim 1 formulated as automotive refinish or OEM wash primer composition.

* * * * *